United States Patent
Shin et al.

(10) Patent No.: US 8,763,040 B2
(45) Date of Patent: *Jun. 24, 2014

(54) METHOD OF PROCESSING TRANSMIT STREAMS INDEPENDENTLY TO DISPLAY MULTIPLE BROADCASTS AT THE SAME TIME AND A RECEIVER FOR IMPLEMENTING THE SAME

(75) Inventors: Eun Kyung Shin, Gumi-si (KR); Jae Kyung Lee, Gumi-si (KR)

(73) Assignee: LG Electronics Inc., Seoul (KR)

( * ) Notice: Subject to any disclaimer, the term of this patent is extended or adjusted under 35 U.S.C. 154(b) by 604 days.

This patent is subject to a terminal disclaimer.

(21) Appl. No.: 12/514,198

(22) PCT Filed: Nov. 5, 2007

(86) PCT No.: PCT/KR2007/005553
§ 371 (c)(1),
(2), (4) Date: Jan. 15, 2010

(87) PCT Pub. No.: WO2008/056920
PCT Pub. Date: May 15, 2008

(65) Prior Publication Data
US 2010/0162295 A1 Jun. 24, 2010

(30) Foreign Application Priority Data
Nov. 10, 2006 (KR) .................. 10-2006-0110969

(51) Int. Cl.
*H04N 5/445* (2011.01)
(52) U.S. Cl.
USPC .............. 725/40; 725/37; 725/38; 725/43; 725/47; 725/48; 348/725; 348/731

(58) Field of Classification Search
USPC .......................... 725/38–40, 30, 51
See application file for complete search history.

(56) References Cited

U.S. PATENT DOCUMENTS

| 4,845,564 A | 7/1989 | Hakamada et al. |
| 5,453,796 A * | 9/1995 | Duffield et al. ............... 348/565 |

(Continued)

FOREIGN PATENT DOCUMENTS

| CA | 2551265 A1 | 12/2006 |
| CN | 1140375 A | 1/1997 |

(Continued)

*Primary Examiner* — Jun Fei Zhong
(74) *Attorney, Agent, or Firm* — Birch, Stewart, Kolasch & Birch, LLP

(57) ABSTRACT

Disclosed are devices for receiving broadcast signal. More specifically, one of the devices includes at least two tuners (102, 103) configured to synchronize at least two transmit stream independently, at least two transmit stream processors (104, 105) each configured to convert the at least one transmit stream into a plurality of audio signals, a plurality of displayable video signals, and a plurality of displayable data signals, a controller (100) configured to provide switching control signal and display control signal based on channel selected by a user, a switching unit (135) configured to output a data broadcast associated with a first broadcast channel and the video and the audio associated with a second broadcast channel, a display module (138) configured to display a video of the first broadcast channel in a first display area and a data of the second broadcast channel in a second display area, and at least one speaker configured to audio output of at least two different broadcast channels. Method for using the device is also disclosed.

9 Claims, 7 Drawing Sheets

(56) References Cited

U.S. PATENT DOCUMENTS

| | | |
|---|---|---|
| 5,675,692 A | 10/1997 | Kang |
| 6,405,372 B1 | 6/2002 | Kim et al. |
| 6,590,618 B1* | 7/2003 | Park et al. .................. 348/734 |
| 6,772,433 B1* | 8/2004 | LaJoie et al. ............... 725/52 |
| 6,922,843 B1* | 7/2005 | Herrington et al. ......... 725/30 |
| 7,401,350 B1 | 7/2008 | Asada |
| 2004/0111744 A1* | 6/2004 | Bae et al. .................... 725/38 |
| 2004/0181814 A1* | 9/2004 | Ellis et al. .................. 725/134 |
| 2005/0166221 A1 | 7/2005 | Pugel et al. |
| 2005/0238320 A1 | 10/2005 | Shultz |
| 2006/0116093 A1 | 6/2006 | Kim |
| 2006/0135099 A1 | 6/2006 | Hoda et al. |
| 2006/0257109 A1* | 11/2006 | Enomoto .................. 386/95 |

FOREIGN PATENT DOCUMENTS

| | | |
|---|---|---|
| CN | 1736102 A | 2/2006 |
| CN | 1783962 A | 6/2006 |
| EP | 1185093 A2 | 3/2002 |
| JP | 11-266215 A | 9/1999 |
| KR | 10-233410 B1 | 12/1999 |
| KR | 10-0269370 B1 | 10/2000 |
| KR | 10-2001-0097415 A | 11/2001 |
| KR | 10-0587272 B1 | 6/2006 |
| WO | WO 95/28044 A1 | 10/1995 |

* cited by examiner

METHOD OF PROCESSING TRANSMIT STREAMS INDEPENDENTLY TO DISPLAY MULTIPLE BROADCASTS AT THE SAME TIME AND A RECEIVER FOR IMPLEMENTING THE SAME

TECHNICAL FIELD

The present invention relates to a receiver, and more particularly, to a method of processing a broadcast signal and a receiver for implementing the same.

BACKGROUND ART

With widespread use and increasing popularity of digital broadcast, a multi-mode system has been receiving much attention as of late. The multi-mode system allows a user to view multiple channels via a single digital of a digital broadcast.

Compared to the conventional broadcast method which only broadcasts video and audio signals, the current or future broadcast systems can include data signal in its broadcast in addition to the video and audio signals. In view of such systems, receivers are being equipped with capabilities to efficiently and effectively accommodate the changing broadcast systems.

Generally, transport stream (TS) for broadcasting are categorized into three (3) types—video signal, audio signal, and data signal.

According to the conventional system, if the user (or viewer) selects a data broadcast function while viewing a broadcast channel, the video and audio corresponding to the selected broadcast (e.g., news, drama) is displayed and outputted, respectively. Moreover, the data broadcast is displayed on the same screen at the same time with the video.

Conventionally, the receiver did not have the capability to receive the data broadcast, and as a result, the data broadcast was received via an external set top box. Furthermore, if the data broadcast is selected in the controller of the receiver (or a television receiver), the video (displayed in "$1^{st}$ display area") corresponding to the broadcast program of the data broadcast channel is displayed along with the data (displayed in "$2^{nd}$ display area") corresponding to the same broadcast channel.

FIG. 1 is an exemplary diagram illustrating concurrent display of video and data broadcast of a same broadcast program.

For example, if a user is currently viewing a news program, the video associated with the news program is displayed in the $1^{st}$ display area of the screen and the audio corresponding to the news program is outputted via the speakers. In addition, data corresponding to the news program is displayed in the $2^{nd}$ display area.

The problem associated with the conventional system is that the video, audio, and the data broadcast are a package. In other words, the video, audio, and the data broadcast are displayed and outputted together. As illustrated in FIG. 1, although the data broadcast and the video may be different, according to the conventional system, the video display and the data broadcast cannot be independently controlled nor displayed.

DISCLOSURE OF THE INVENTION

Technical Problem

The problem associated with the conventional system is that the video, audio, and the data broadcast are a package. In other words, the video, audio, and the data broadcast are displayed and outputted together. As illustrated in FIG. 1, although the data broadcast and the video may be different, according to the conventional system, the video display and the data broadcast cannot be independently controlled nor displayed.

Technical Solution

Accordingly, the present invention is directed to a method of processing a broadcast signal and a receiver for implementing the same that substantially obviates one or more problems due to limitations and disadvantages of the related art.

An object of the present invention is to provide a device for receiving broadcast signal.

Another object of the present invention is to provide a method of displaying independently displaying at least one video and at least one data broadcast by a receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a device for receiving broadcast signal includes at least two tuners configured to synchronize at least two transmit streams independently, at least two transmit stream processors each configured to convert the at least one transmit stream into a plurality of audible audio signals, a plurality of displayable video signals, and a plurality of displayable data signals, a controller configured to provide switching control signal and display control signal based on channel selected by a user, a switching unit configured to output a data broadcast associated with a first broadcast channel and the video and the audio associated with a second broadcast channel, a display module configured to display a video of the first broadcast channel in a first display area and a data of the second broadcast channel in a second display area, and at least one speaker configured to output audible audio of at least two different broadcast channels.

In another aspect of the present invention, a device for receiving broadcast signal includes a first tuner and a second tuner configured to independently synchronize a first transmit stream and a second transmit stream, respectively, a transmit stream processor configured to convert each of the first and second transmit streams into a plurality of audible audio signals, a plurality of displayable video signals, and a plurality of displayable data signals, a controller configured to provide switching control signal and display control signal based on channel selected by a user, a switching unit configured to output a data broadcast associated with a first broadcast channel selected from the plurality of displayable data signals and the video and the audio associated with a second broadcast channel selected from the plurality of displayable video signals and audible audio signals, respectively, a display module configured to display the data broadcast associated with the first broadcast channel in a first display area and the video associated with the second broadcast channel in a second display area, and a first speaker and a second speaker for outputting audible audio of the first broadcast channel and the second broadcast channel, respectively.

In a further aspect of the present invention, a method of displaying independently displaying at least one video and at least one data broadcast by a receiver includes synchronizing at least two transmit streams independently, converting the at least one transmit stream into a plurality of audible audio signals, a plurality of displayable video signals, and a plurality of displayable data signals, providing switching control signal and display control signal based on channel selected by a user, outputting a data broadcast associated with a first broadcast channel and the video and the audio associated with a second broadcast channel, displaying a video of the first broadcast channel in a first display area and a data of the second broadcast channel in a second display area, and outputting audible audio of at least two different broadcast channels.

It is to be understood that both the foregoing general description and the following detailed description of the present invention are exemplary and explanatory and are intended to provide further explanation of the invention as claimed.

DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
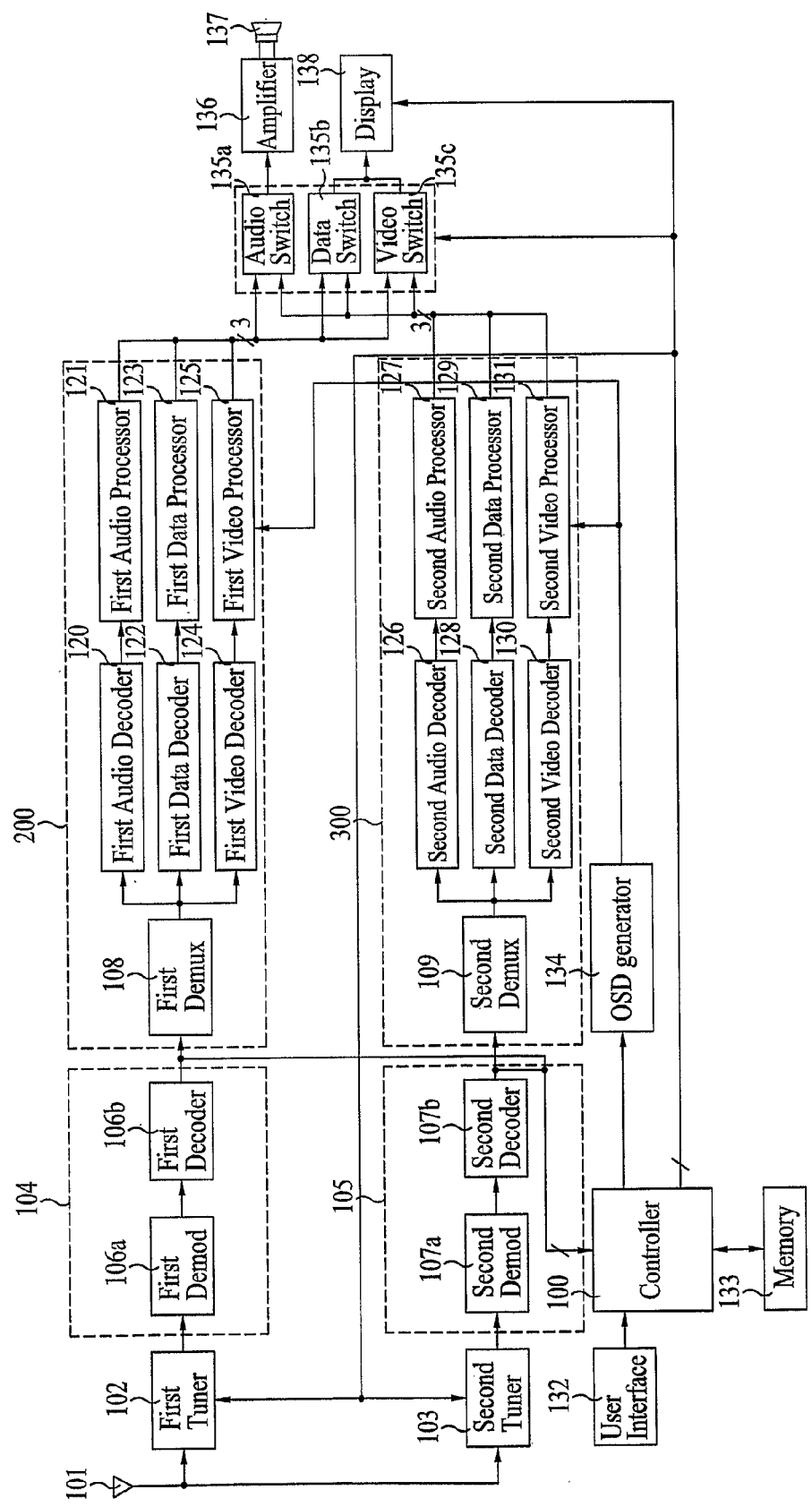
FIG. 2 is an exemplary block diagram illustrating a structure of a receiver.

FIG. 2 is an exemplary block diagram illustrating a structure of a receiver (or a television receiver). Referring to FIG. 2, the receiver (or the television receiver) comprises a controller 100, a memory 133, a user interface 132, an on-screen display (OSD) generator 134, an antenna 101, a first tuner 102, a second tuner 103, a first digital broadcast signal processor 104, a second digital broadcast signal processor 105, a first broadcast signal output unit 200, a second broadcast signal output unit 300, a switching unit 135, an amplifier 136, a speaker 137, and a display module 138. Although two (2) tuners (the first tuner and the second tuner) are illustrated in FIG. 2, additional number of tuners can also be used. In addition, the receiver can have more than one antenna and more than one speaker.

More detailed operational features of the components of the receiver will be discussed. In detail, the controller 100 can control the receiver. The OSD generator 134 can generate OSD data under the control of the controller 100. The first tuner 102 and the second tuner 103 can each tune (or synchronize) broadcast channel under the control of the controller 100. The first digital broadcast signal processor 104 and the second digital broadcast signal processor 105 can process the digital broadcast signal (or the TS) from the first tuner 102 and the second tuner 103, respectively.

Furthermore, the first broadcast signal output unit 200 and the second broadcast signal output unit 300 can facilitate display and output of video and audio, respectively, after separating the video, audio, and data signals from the output signal of the first digital broadcast signal processor 104 and the second digital broadcast signal processor 105, respectively. The switching unit 135 can selectively output video, audio, and/or data outputted from the first broadcast signal output unit 200 and the second broadcast signal output unit 300. The amplifier 136 can amplify the audio from the switching unit 135 and output the amplified audio signal to the speaker 137. Thereafter, the speaker 137 can convert the signals outputted from the amplifier 136 and output audible signals. Lastly, the display module 138 can display video and data outputted from the switching unit 135.

Hereafter, a more detailed description of the components of the receiver will be provided. The receiver, as discussed above, is not limited to a television receiver but can also be a different type of receiver (e.g., set top box). However, the discussion to follow will be based on the television receiver.

Generally, the controller 100 can control the television broadcast receiver. In particular, the controller 100 can control the operations of the first tuner 102 and the second tuner 103 based on the selection of the viewer (or user) of the data broadcast. Moreover, the controller 100 can control the operation of the switching unit 135 for outputting desired audio, video, and/or data signals. In addition, the controller 100 can control generation of OSD data corresponding to the user selection by the OSD generator 134.

The memory 133 can store various information including system programs of the controller 100. The user interface 132 can be a device (e.g., keypad or remote controller) or keys/buttons on the receiver, for example, through which various commands and/or information may be inputted from the user to the controller 100. The OSD generator 134 can generate OSD data under the control of the controller 100 and provide the generated OSD data to the first broadcast signal output unit 200 and the second broadcast signal output unit 300.

The first tuner 102 and the second tuner 103 can each tune (or synchronize) a broadcast channel from multiple broadcast signals received in TS form, and the TS of the tuned broadcast channel can then be provided to the first digital broadcast signal processor 104 and the second digital broadcast signal processor 105.

The first digital broadcast signal processor 104 can include a first demodulator 106a and a first decoder 106b. The first demodulator 106a can demodulate the TS provided by the first tuner 102, and the first decoder 106b can decode and convert the demodulated TS into a video stream, an audio stream, and a data stream before providing the converted streams to the first broadcast signal output unit 200.

The second digital broadcast signal processor 105 can include a second demodulator 107a and a second decoder 107b. The second demodulator 107a can demodulate the TS provided by the second tuner 103, and the second decoder 107b can decode and convert the demodulated TS into a video stream, an audio stream, and a data stream before providing the converted streams to the first broadcast signal output unit 300.

The first broadcast signal output unit 200 comprises a first demultiplexer 108, a first audio decoder 120, a first audio processor 121, a first data decoder 122, a first data processor 123, a first video decoder 124, and a first video processor 125.

In detail, the first demultiplexer 108 can separate (or demultiplex) the audio, video, and data streams outputted from the first digital broadcast signal processor 104. The first audio decoder 120 can decode the audio stream demultiplexed by the first demultiplexer 108. The decoded audio signal can then be converted into audible audio signal by the first audio processor 121.

In addition, the first data decoder 122 can decode the data stream demultiplexed by the first demultiplexer 108. The first data processor 123 can then decode the decoded data signal into a data than can be displayed. Lastly, the first video decoder 124 can decode the video stream demultiplexed by the first demultiplexer 108. The decoded video signal can then be converted into video signal that can be displayed by the first video processor 125.

The second broadcast signal output unit 200 comprises a second demultiplexer 109, a second audio decoder 126, a second audio processor 127, a second data decoder 128, a second data processor 129, a second video decoder 130, and a second video processor 131.

In detail, the second demultiplexer 109 can separate (or demultiplex) the audio, video, and data streams outputted from the second digital broadcast signal processor 105. The second audio decoder 126 can decode the audio stream demultiplexed by the second demultiplexer 109. The decoded audio signal can then be converted into audible audio signal by the second audio processor 127.

In addition, the second data decoder 128 can decode the data stream demultiplexed by the second demultiplexer 109. The second data processor 129 can then decode the decoded data signal into a data than can be displayed. Lastly, the second video decoder 130 can decode the video stream demultiplexed by the second demultiplexer 109. The decoded video signal can then be converted into video signal that can be displayed by the second video processor 131.

The OSD generator 134 can provide the generated OSD data to the first video processor 125 of the first broadcast signal output unit 200 and the second video processor 131 of the second broadcast signal output unit 300 so that the provided OSD data can be mixed with each video and displayed on the screen.

The switching unit 135 comprises an audio switch 135a, a data switch 135b, and a video switch 135c. More specifically, the audio switch 135a can send any one of the two (2) audible signals outputted from the first audio processor 121 or the second audio processor 127 to the amplifier 136 in response to the control signal from the controller 100. The data switch 135b can send any one of the two (2) data that can be displayed outputted from the first data processor 123 and the second data processor 129 to the display module 138 in response to the control signal from the controller 100. The video switch 136b can send any one of the two (2) displayable video signals outputted from the first video processor 125 and the second video processor 131 to the display module 138 in response to the control signal from the controller 100.

The display module 138 can include a liquid crystal display (LCD) module, a plasma display panel (PDP) module, a cathode ray tube (CRT) module, an organic light emitting display (OLED), and a light emitting display (LED), among other modules.

In the discussion above, there are two (2) of the digital broadcast signal processors and of the broadcast signal output units. However, if there are more than two (2) tuners, the number of the digital broadcast signal processors and of the broadcast signal output units can correspond with the number of the tuners. Moreover, if there are more than two (2) tuners, it is possible to display more than two (2) picture-in-picture (PIP) on the screen according to the changes to the system program of the television broadcast receiver.

Figure 3:
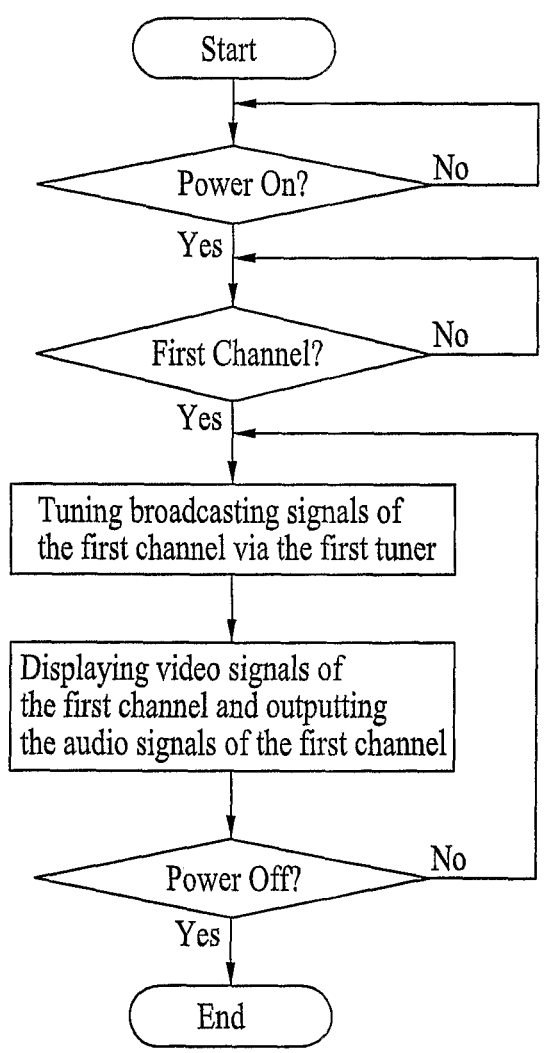
FIG. 3 is an exemplary flowchart illustrating a broadcast signal process.

FIG. 3 is an exemplary flowchart illustrating a broadcast signal process. Referring to FIG. 3, after the power is turned on, the controller 100 determines whether the user (or the viewer) has selected a channel (e.g., a first channel) via the user interface 132. If it is determined that the first channel is selected, the controller 100 then synchronize the broadcast signal corresponding to the first channel via the first tuner (also referred to as the main tuner).

The controller 100 then displays the video of the first channel on the entire screen of the display module 138 and outputs the audio associated with the first channel via the speaker 137. At this time, the audio switch 135a of the switching unit 135 is turned on and outputs the audio from the first audio processor 121. In addition, the video switch 135c is also turned on and outputs the video from the first video processor 125. Here, the video is displayed on the full screen. The video and audio remains on, that is, the video is displayed and audio is outputted, until the receiver power is turned off.

In this example, the video and audio continually outputs the displayable video and audible audio of the selected broadcast. However, since the data broadcast button (not shown) on the user interface 132 has not been pressed or selected by the user (or viewer), the data switch 135b remains in 'off' status and thus no output is generated.

Figure 4:
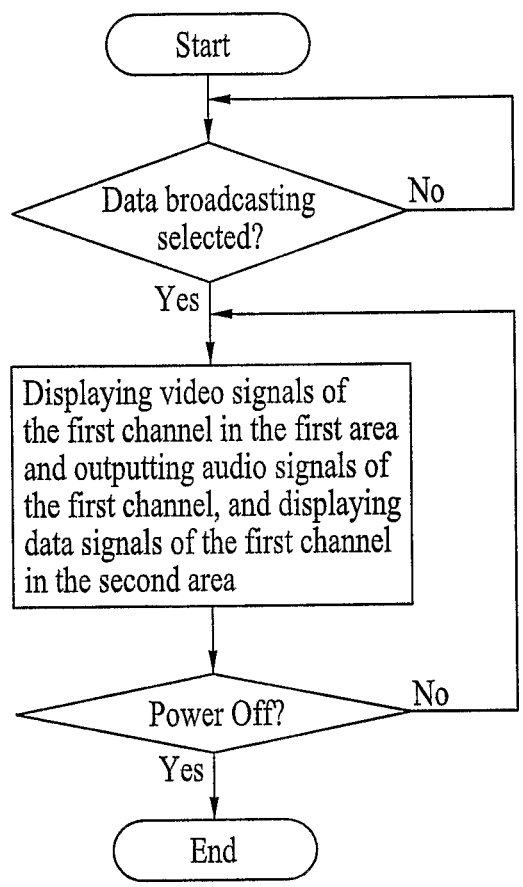
FIG. 4 is another exemplary flowchart illustrating a broadcast signal process.

FIG. 4 is another exemplary flowchart illustrating a broadcast signal process. Referring to FIG. 4, while the video of the first channel is displayed on the full screen and the audio of the first channel is outputted, the controller 100 checks whether the data broadcast key or button is pressed or not. If the controller 100 determines that the data broadcast is selected by the user, then the controller 100 turns on the data switch 135b of the switching unit 135 and outputs the data broadcast outputted from the first data processor 123.

Figure 1:
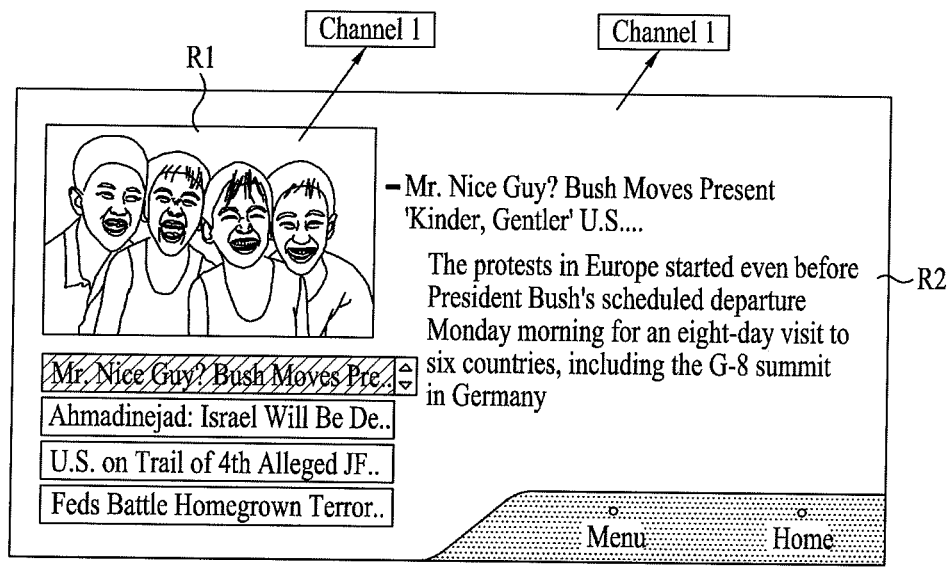
FIG. 1 is an exemplary diagram illustrating concurrent display of video and data broadcast of a same broadcast program.

The display module 138 then displays the video associated with the first channel in a specified portion of the screen (also referred to as "$1^{st}$ display area"). More specifically, as shown in FIG. 1, the video is displayed on the left side of the screen and not the full screen. Moreover, the audio associated with the first channel is outputted via the speaker 137.

In addition, the data broadcast outputted via the data switch 135b is displayed on a different part of the screen from the video (also referred to as "$2^{nd}$ display area"). That is, the video of the first channel and the data of the first channel are displayed on the same screen in the $1^{st}$ display area and the $2^{nd}$ display area, respectively, until the power of the television broadcast receiver is turned off.

Figure 5:
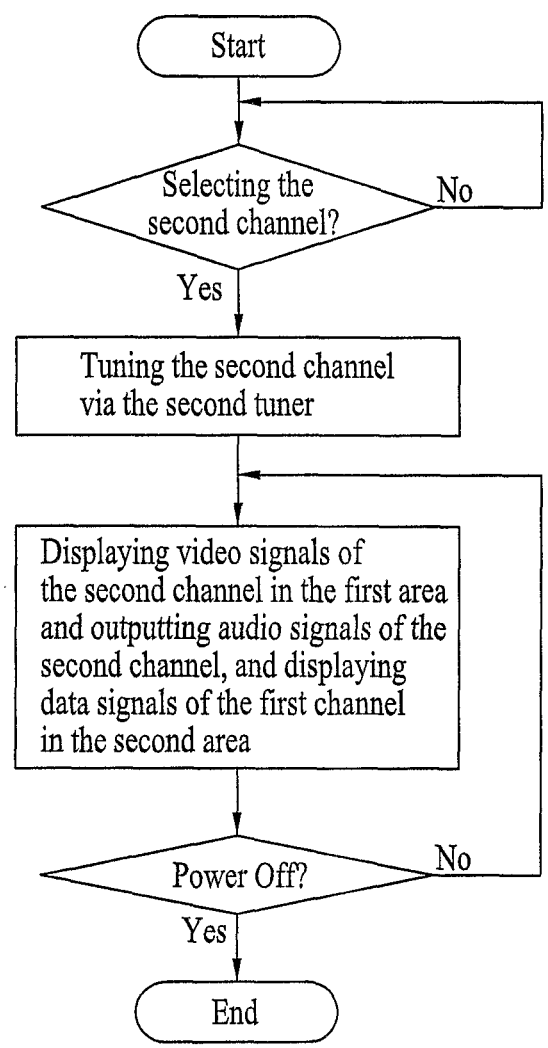
FIG. 5 is another exemplary flowchart illustrating a broadcast signal process.

FIG. 5 is another exemplary flowchart illustrating a broadcast signal process. Referring to FIG. 5, while viewing the video and data of the first channel on the same screen (e.g., video associated with the first channel on the $1^{st}$ display area, and the data associated with the first channel on the $2^{nd}$ display area), it is possible for the viewer to desire to watch video of a different channel. In other words, it is possible for the user to desire to change the channel of the video only without affecting the data broadcast of the current channel (e.g., first channel). Subsequently, if the viewer selects another channel (e.g., second channel) via the user interface 132 during viewing of the first channel, the second tuner 103 of the controller 100 synchronizes the broadcast signal of the second channel.

In such a case, the TS corresponding to the second channel is then processed sequentially by the components of the receiver, whose functions are described above, providing video, audio, and data associated with the second channel to the switching unit 135. The audio switch 135a and the video switch 135c of the switching unit 135 outputs the audio and video of the second channel, and the data switch 135b continues to display the data associated with the first channel. Moreover, the display module 138 displays the video of the second channel in the $1^{st}$ display area and the speaker 137 outputs audio of the second channel as well. However, in the $2^{nd}$ display area of the display module 138 screen, the data broadcast of the first channel is displayed despite the change in the $1^{st}$ display area.

Figure 6:
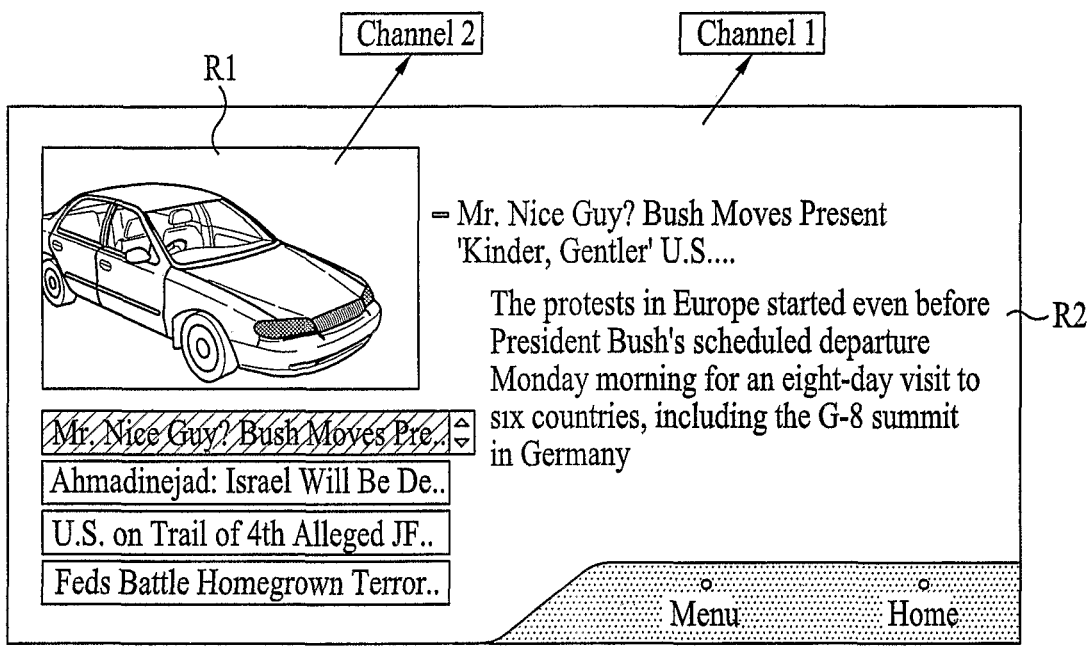
FIG. 6 is an exemplary diagram illustrating independent operation of the $1^{st}$ display area and the $2^{nd}$ display area.

FIG. 6 is an exemplary diagram illustrating independent operation of the $1^{st}$ display area and the $2^{nd}$ display area. Referring to FIG. 6, the video of the second channel is displayed in the $1^{st}$ display area, and the data broadcast of the first channel is displayed in the $2^{nd}$ display area. As shown in FIG. 6, the $1^{st}$ display area is on the left side of the screen while the $2^{nd}$ display area is on the right side of the screen. However, the positions of the $1^{st}$ and $2^{nd}$ display areas can be set differently by the manufacturer and/or by the user.

Figure 7:
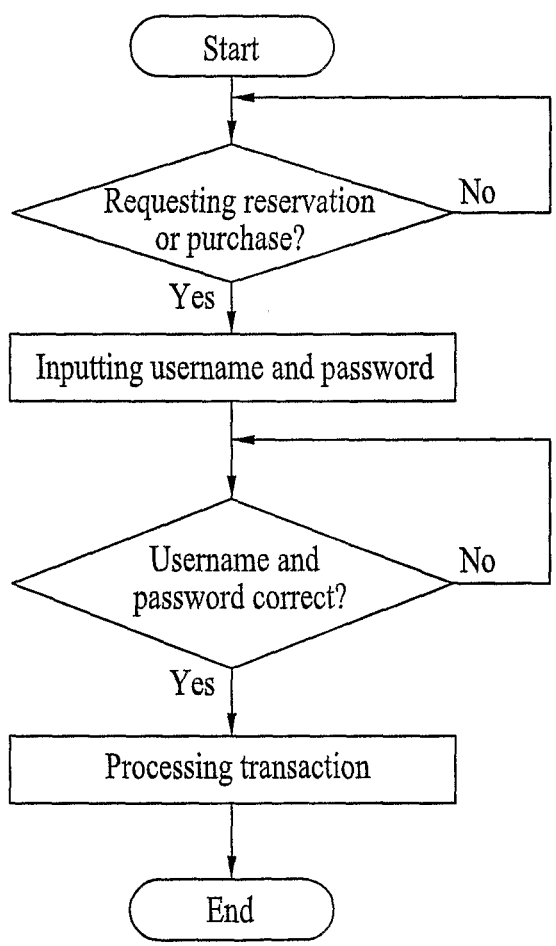
FIG. 7 is an exemplary flowchart illustrating purchasing a product while viewing the data broadcast.

FIG. 7 is an exemplary flowchart illustrating purchasing a product while viewing the data broadcast. Referring to FIG. 7, the user can purchase a product or reserve a show via the video displayed in the $1^{st}$ display area. More specifically, while the user is viewing the data broadcast of the first channel in the $2^{nd}$ display area, if the user desires to purchase a product or reserve a show from a different channel (e.g., second channel) displayed on the $1^{st}$ display area, as discussed, then the video of the second channel is displayed in the first area.

The user can then browse through the list of products or show schedules displayed in the $1^{st}$ display area, and select and order the product and/or the show of the user's choice via the user interface 132. When the product or show is selected, the OSD is displayed asking to user to enter identification and a password.

As discussed, the OSD is generated by the OSD generator 134. The generated OSD is then provided to the first video processor 125 or the second video processor 131 and mixed with the video of the first channel in the first video processor 125 or mixed with the video of the second channel in the second video processor 131.

If it is determined that the identification and the password inputted by the user correspond with the identification and the password stored in the memory, the user is then given permission to place the order for the product or show.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A device for processing transmit streams independently to display a video and a displayable data broadcast at the same time, comprising:
    a plurality of tuners configured to tune a plurality of transmit streams independently and to output the plurality of tuned transmit streams;
    a plurality of signal output units, comprising:
        a plurality of demultiplexers configured to demultiplex each of the plurality of tuned transmit streams into a plurality of respective demultiplexed streams including at least one audio stream, at least one video stream, and at least one displayable data stream,
        a plurality of decoders configured to decode the demultiplexed audio, video, and displayable data streams, and
        a plurality of transmit stream processors configured to convert the decoded audio, video, and displayable data streams into at least one processed audio stream, at least one processed video stream, and at least one processed displayable data stream;
    a switching unit including an audio switch, a video switch, and a data switch, the switching unit selectively switch the processed audio, video and displayable data stream as an output audio signal, an output video signal and an output displayable data to a display;
    a user interface configured to receive a user request signal;
    a controller configured to provide a switching control and a display control based on the user request signal;
    wherein the display configured to display a first data associated with a first broadcast channel from a first tuned transmit stream in a first portion of the display, and to display a first video associated with the first broadcast channel from the first tuned transmit stream in a second portion of the display, at the same time; and
    at least one speaker configured to output audio associated with the first broadcast channel,
    wherein the data switch is switched on by the controller when the user interface receives the user request signal,
    wherein the data switch is configured to selectively switch the processed displayable data stream associated with the first broadcast channel,
    wherein the audio switch and the video switch are configured to selectively switch the respective processed audio stream and processed video stream associated with a second broadcast channel,
    wherein, in response to a user request for the second broadcast channel while displaying the first video associated with the first broadcast channel and the displayable data, the display is further configured to display the first data associated with the first broadcast channel in the first portion of the display, and at the same time to display a second video associated with the second broadcast channel from a second tuned transmit stream in the second portion of the display,
    wherein the at least one speaker is configured to output audio associated with the second broadcast channel in response to the user request for the second broadcast channel, and
    wherein the controller is further configured to control a generation of an on-screen display (OSD) based on the channel selection by the user.

2. The device of claim 1, wherein the OSD is generated based on a user selection of the first broadcast channel or the second broadcast channel.

3. The device of claim 1, wherein the first broadcast channel and the second broadcast channel correspond to different broadcast channels.

4. The device of claim 1, wherein each of the plurality of transmit stream processors is further configured to demodulate the decoded audio, video, and displayable data streams.

5. The device of claim 4, wherein each of the plurality of transmit stream processors is further configured to independently process the decoded audio, video, and displayable data streams.

6. The device of claim 1, wherein the audio switch in the switching unit is configured to selectively output a converted audio signal received from at least one of the plurality of signal output units.

7. The device of claim 1, wherein a number of the plurality of tuners, a number of the plurality of transmit stream processors, and a number of the plurality of signal output units are the same.

8. The device of claim 1, wherein the OSD which includes user-selectable items and further comprises a window for allowing the user to input a user identification and a password when at least one item is selected from the user-selectable items.

9. The device of claim 1, wherein the control unit is further configured to compare the user identification and the password inputted by the user with a corresponding user identification and a password stored in a memory.

* * * * *